US011504791B2

(12) United States Patent
Hung et al.

(10) Patent No.: US 11,504,791 B2
(45) Date of Patent: Nov. 22, 2022

(54) WELDING TORCH WITH A TEMPERATURE MEASUREMENT DEVICE

(71) Applicant: ILLINOIS TOOL WORKS INC., Glenview, IL (US)

(72) Inventors: Derek Yu-Fung Hung, Greenville, WI (US); John Alan Luck, Appleton, WI (US); Mark Steven Kadlec, Shiocton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 282 days.

(21) Appl. No.: 16/715,598

(22) Filed: Dec. 16, 2019

(65) Prior Publication Data

US 2020/0114451 A1    Apr. 16, 2020

Related U.S. Application Data

(63) Continuation of application No. 15/012,454, filed on Feb. 1, 2016, now Pat. No. 10,537,956, which is a continuation of application No. 13/759,876, filed on Feb. 5, 2013, now Pat. No. 9,266,182.

(60) Provisional application No. 61/621,439, filed on Apr. 6, 2012.

(51) Int. Cl.
*B23K 9/095* (2006.01)
*B23K 9/10* (2006.01)
*B23K 9/16* (2006.01)
*B23K 9/32* (2006.01)

(52) U.S. Cl.
CPC .......... *B23K 9/0956* (2013.01); *B23K 9/1006* (2013.01); *B23K 9/16* (2013.01); *B23K 9/164* (2013.01); *B23K 9/32* (2013.01)

(58) Field of Classification Search
None
See application file for complete search history.

(56) References Cited

U.S. PATENT DOCUMENTS

| 2,448,199 A | 8/1948 | Vollrath |
| 2,986,624 A | 5/1961 | Marta |
| 3,053,968 A * | 9/1962 | Gorman ................ B23K 9/167 219/74 |
| 3,370,151 A | 2/1968 | Normando |

(Continued)

FOREIGN PATENT DOCUMENTS

| EP | 0092753 | 11/1983 |
| EP | 1445055 | 8/2004 |

(Continued)

OTHER PUBLICATIONS

Machine translation of JP-08229681-A, Feb. 2022.*

(Continued)

*Primary Examiner* — Geoffrey S Evans
(74) *Attorney, Agent, or Firm* — McAndrews, Held & Malloy, Ltd.

(57) ABSTRACT

Various welding systems including a welding torch assembly are provided. The welding torch assemblies may include a welding torch adapted to be utilized in a welding operation to establish a welding arc between the welding torch and a workpiece. The welding torch assemblies may also include a temperature sensing system integral with the welding torch and adapted to sense a temperature of the workpiece.

20 Claims, 7 Drawing Sheets

(56) References Cited

U.S. PATENT DOCUMENTS

| | | | |
|---|---|---|---|
| 3,437,807 A | 4/1969 | Moore | |
| 3,567,899 A | 3/1971 | Iceland et al. | |
| 3,689,733 A | 9/1972 | Matasovic | |
| 3,836,747 A | 9/1974 | Wlos | |
| 4,020,907 A | 5/1977 | Luck | |
| 4,399,346 A | 8/1983 | Kearney | |
| 4,450,339 A | 5/1984 | Corby, Jr. | |
| 4,484,059 A | 11/1984 | Lillquist | |
| 4,502,792 A | 3/1985 | Hunsucker | |
| 4,532,404 A | 7/1985 | Boillot et al. | |
| 4,555,614 A * | 11/1985 | Morris | B23K 9/0956 219/130.01 |
| 4,594,497 A * | 6/1986 | Takahashi | B23K 9/0956 219/130.21 |
| 4,609,804 A * | 9/1986 | Kishi | B23K 35/224 219/137.43 |
| 4,663,513 A | 5/1987 | Webber | |
| 4,664,587 A | 5/1987 | Case, Jr. et al. | |
| 4,680,440 A | 7/1987 | Barlet | |
| 4,877,940 A | 10/1989 | Bangs et al. | |
| 4,889,483 A | 12/1989 | Gentry | |
| 4,942,281 A | 7/1990 | Srba | |
| 4,998,005 A | 3/1991 | Rathi et al. | |
| 5,011,297 A | 4/1991 | Tittl | |
| 5,123,739 A | 6/1992 | Takenouchi et al. | |
| 5,211,478 A | 5/1993 | Horsley | |
| 5,235,156 A | 8/1993 | Kamimura et al. | |
| 5,500,512 A | 3/1996 | Goldblatt | |
| 5,651,903 A * | 7/1997 | Shirk | B23K 26/032 219/121.64 |
| 5,811,055 A * | 9/1998 | Geiger | B23K 9/325 266/49 |
| 6,002,104 A | 12/1999 | Hsu | |
| 6,090,050 A * | 7/2000 | Constantinides | A61B 5/447 374/142 |
| 6,091,044 A | 7/2000 | Larranaga | |
| 6,091,048 A | 7/2000 | Lanouette et al. | |
| 6,096,994 A | 8/2000 | Handa et al. | |
| 6,106,150 A * | 8/2000 | Lindholm | B22D 2/006 374/139 |
| 6,130,407 A | 10/2000 | Villafuerte | |
| 6,242,711 B1 | 6/2001 | Cooper | |
| 6,248,975 B1 | 6/2001 | Lanouette et al. | |
| 6,267,291 B1 | 7/2001 | Blankenship et al. | |
| 6,364,524 B1 | 4/2002 | Markham | |
| 6,476,354 B1 | 11/2002 | Jank et al. | |
| 6,479,793 B1 | 11/2002 | Wittmann et al. | |
| 6,510,984 B2 | 1/2003 | Blankenship et al. | |
| 6,515,251 B1 | 2/2003 | Wind | |
| 6,536,660 B2 | 3/2003 | Blankenship et al. | |
| 6,552,303 B1 | 4/2003 | Blankenship et al. | |
| 6,563,085 B2 | 5/2003 | Lanouette et al. | |
| 6,583,386 B1 | 6/2003 | Ivkovich | |
| 6,700,097 B1 | 3/2004 | Hsu et al. | |
| 6,708,877 B2 | 3/2004 | Blankenship et al. | |
| 6,710,299 B2 | 3/2004 | Blankenship et al. | |
| 6,750,428 B2 | 6/2004 | Okamoto et al. | |
| 6,852,949 B2 | 2/2005 | Lanouette et al. | |
| 6,901,089 B1 | 5/2005 | Hollander | |
| 7,032,814 B2 | 4/2006 | Blankenship | |
| 7,089,337 B2 | 8/2006 | Senoo et al. | |
| 7,130,255 B2 | 10/2006 | Smith | |
| 7,342,210 B2 | 3/2008 | Fergason | |
| 7,501,613 B2 | 3/2009 | Fergason | |
| 7,510,047 B2 | 3/2009 | Muto et al. | |
| 7,510,151 B2 | 3/2009 | Perez-Sanchez | |
| 7,550,689 B2 | 6/2009 | Wech et al. | |
| 8,338,743 B2 | 12/2012 | Wanner et al. | |
| 8,569,655 B2 | 10/2013 | Cole | |
| 9,415,459 B2 | 8/2016 | Bornemann | |
| 10,537,956 B2 * | 1/2020 | Hung | B23K 9/164 |
| 2004/0050905 A1 | 3/2004 | Endo et al. | |
| 2005/0002083 A1 | 1/2005 | Fergason | |
| 2005/0007504 A1 | 1/2005 | Fergason | |
| 2005/0007667 A1 | 1/2005 | Fergason | |
| 2005/0017152 A1 | 1/2005 | Fergason | |
| 2007/0080149 A1 | 4/2007 | Albrecht et al. | |
| 2007/0080152 A1 | 4/2007 | Albrecht et al. | |
| 2007/0080153 A1 | 4/2007 | Albrecht et al. | |
| 2007/0089215 A1 | 4/2007 | Biche et al. | |
| 2007/0108173 A1 | 5/2007 | Zamuner | |
| 2007/0158319 A1 | 7/2007 | Connally et al. | |
| 2007/0262065 A1 | 11/2007 | Peters et al. | |
| 2008/0006613 A1 | 1/2008 | Ulrich | |
| 2008/0029495 A1 * | 2/2008 | Emiljanow | B23K 26/32 219/121.61 |
| 2008/0061049 A1 | 3/2008 | Albrecht | |
| 2008/0090193 A1 * | 4/2008 | Soanes | F26B 21/06 700/207 |
| 2009/0071949 A1 | 3/2009 | Harris | |
| 2009/0152251 A1 | 6/2009 | Dantinne et al. | |
| 2009/0298024 A1 | 12/2009 | Batzler et al. | |
| 2010/0086003 A1 | 4/2010 | Pfitzner et al. | |
| 2010/0111744 A1 | 5/2010 | Schleiss | |
| 2010/0123080 A1 | 5/2010 | Andres et al. | |
| 2010/0133248 A1 | 6/2010 | Pinon et al. | |
| 2010/0217440 A1 | 8/2010 | Lindell | |
| 2010/0282725 A1 * | 11/2010 | Johnson | B23K 26/0665 219/121.67 |
| 2010/0308026 A1 * | 12/2010 | Vogel | H02M 3/33515 219/130.21 |
| 2011/0049115 A1 | 3/2011 | Luo | |
| 2011/0091758 A1 | 4/2011 | Loukusa et al. | |
| 2011/0114611 A1 | 5/2011 | Cole | |
| 2011/0117527 A1 | 5/2011 | Conrardy et al. | |
| 2011/0168693 A1 * | 7/2011 | Rudd | B23K 11/115 228/9 |
| 2011/0304471 A1 | 12/2011 | Ko et al. | |
| 2012/0223057 A1 * | 9/2012 | Iordache | B23K 9/167 219/75 |
| 2013/0051424 A1 | 2/2013 | Yuan | |
| 2013/0087543 A1 | 4/2013 | Denney | |
| 2014/0157861 A1 | 6/2014 | Jonas | |
| 2014/0246406 A1 * | 9/2014 | Oono | B23K 9/167 219/74 |

FOREIGN PATENT DOCUMENTS

| | | | |
|---|---|---|---|
| EP | 1486283 A1 | 12/2004 | |
| EP | 1486283 | 4/2007 | |
| EP | 2027962 | 2/2009 | |
| EP | 2189786 | 5/2010 | |
| EP | 1683599 | 5/2014 | |
| JP | S58116774 | 1/1983 | |
| JP | 1181969 | 7/1989 | |
| JP | 08229681 A * | 9/1996 | |
| JP | h08229681 | 9/1996 | |
| JP | 09300088 A * | 11/1997 | |
| JP | 2007021542 | 2/2007 | |
| WO | 0158400 A1 | 8/2001 | |
| WO | 2008025553 | 3/2008 | |

OTHER PUBLICATIONS

Machine translation of JP-09300088-A, Feb. 2022.*
International Search Report for PCT application No. PCT/US2013/035196 dated Jul. 23, 2013, 14 pgs.
International Search Report for PCT application No. PCT/US2013/035197 dated Nov. 4, 2013, 17 pgs.
Kozono Y et al., "Control of Back Bead Width in Girth TIG Welding of Small Tubes Using Surface Temperature Monitoring," Welding International, Taylor & Francis, Abingdon, GB, vol. 3, No. 2, 1989, pp. 137-141. [Note: The year of publication (1989) of this reference is sufficiently earlier than the priority date (Apr. 6, 2012) of the present application so that the particular month of publication is not in issue.].

* cited by examiner

WELDING TORCH WITH A TEMPERATURE MEASUREMENT DEVICE

CROSS REFERENCE TO RELATED APPLICATIONS

This application claims priority to, and is a continuation of, co-pending U.S. application Ser. No. 15/012,454, entitled "Welding Torch with a Temperature Measurement Device," having a filing date of Feb. 1, 2016, which claims priority to, and is a continuation of, U.S. patent application Ser. No. 13/759,876 (now U.S. Pat. No. 9,266,182), entitled "Welding Torch with a Temperature Measurement Device," having a filing date of Feb. 5, 2013, which is a non-provisional patent application of U.S. Provisional Patent Application No. 61/621,439, entitled "Welding Torch with a Temperature Measurement Device," having a filing date of Apr. 6, 2012, all of which are incorporated herein by reference in their entirety.

BACKGROUND

The invention relates generally to welding systems, and more particularly to welding torch assemblies having temperature sensing systems.

Welding is a process that has become increasingly ubiquitous in all industries. While such processes may be automated in certain contexts, a large number of applications continue to exist for manual welding operations performed by skilled welding technicians. Traditional process welding systems support a variety of processes, such as metal inert gas (MIG) welding, tungsten inert gas (TIG) welding, stick welding, and so forth, which may operate in different triodes, such as constant current or constant voltage. These power sources provide conditioned power for the welding application, and features of this provided power are governed by one or more settings input by a welding operator. Many welding applications, such as welding of aerospace parts, require the operator to utilize a TIG process, typically for finer or more intricate welds. Such intricate forms of welding a desired part may be sensitive to weld conditions and parameters, and, accordingly, it may be desirable to monitor these processes throughout the various stages of a welding operation, including before, during, and after establishment of a welding arc. In some cases, monitoring of the parameters of these processes may require use of an auxiliary device and/or interruption of the welding arc for measurements to be obtained, thus reducing the efficiency and accuracy of the welding process. Accordingly, there exists a need for systems that enable an operator to measure parameters of a welding operation with minimal inconvenience for the welding operator, particularly in environments where the welding operation is intricate.

BRIEF DESCRIPTION

In one embodiment, a welding system includes a welding torch assembly. The welding torch assembly includes a welding torch adapted to be utilized in a welding operation to establish a welding arc between the welding torch and a workpiece. The welding torch assembly also includes a temperature sensing system integral with the welding torch and adapted to sense a temperature of the workpiece.

In another embodiment, a welding system includes a welding power source including power conversion circuitry adapted to receive primary power and to convert the primary power to a weld power output for use in a welding operation. The welding power source also includes a temperature sensing system integral with a welding torch. The temperature sensing system includes a temperature probe adapted to sense a temperature of a workpiece and a display adapted to display the sensed temperature of the workpiece.

In a further embodiment, a welding system includes a welding torch assembly. The welding torch assembly includes a welding torch adapted to be utilized in a welding operation to establish a welding arc between the welding torch and a workpiece. The welding torch assembly also includes a temperature sensing system reversibly coupled to the welding torch in a tool-less engagement and adapted to sense a temperature of the workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, various embodiments of welding systems having temperature sensing systems capable of sensing a temperature of a weld bead and/or a workpiece are disclosed. Some embodiments may integrate the temperature sensing system with the welding torch, thus reducing or eliminating the need for auxiliary temperature sensing devices, such as handheld thermometers. For example, in one embodiment, a digital temperature probe may be disposed on a back portion of a tungsten inert gas (TIG) torch such that an operator may rotate the TIG torch to conveniently position the digital temperature probe for temperature acquisition. For further example, in another embodiment, an infrared sensor system may be mechanically coupled to a welding torch and capable of measuring the desired temperature during a welding operation without the establishment of physical contact between the sensor system and the workpiece. The temperature sensing capabilities provided by the disclosed welding torches and their respective integrated temperature sensing systems may be particularly advantageous when performing intricate welds that are sensitive to temperature changes, such as welds performed utilizing tungsten inert gas (TIG) welding. However, presently disclosed embodiments are compatible with a variety of suitable welding processes, such as metal inert gas (MIG) welding, stick welding, and so forth, or any particular welding process or regime. That is, it should be noted that although the illustrated embodiments are described in the context of TIG welding systems and the illustrated temperature sensing systems are shown coupled to TIG welding torches, the presently disclosed embodiments are also compatible with a variety of other welding systems and devices.

Figure 1:
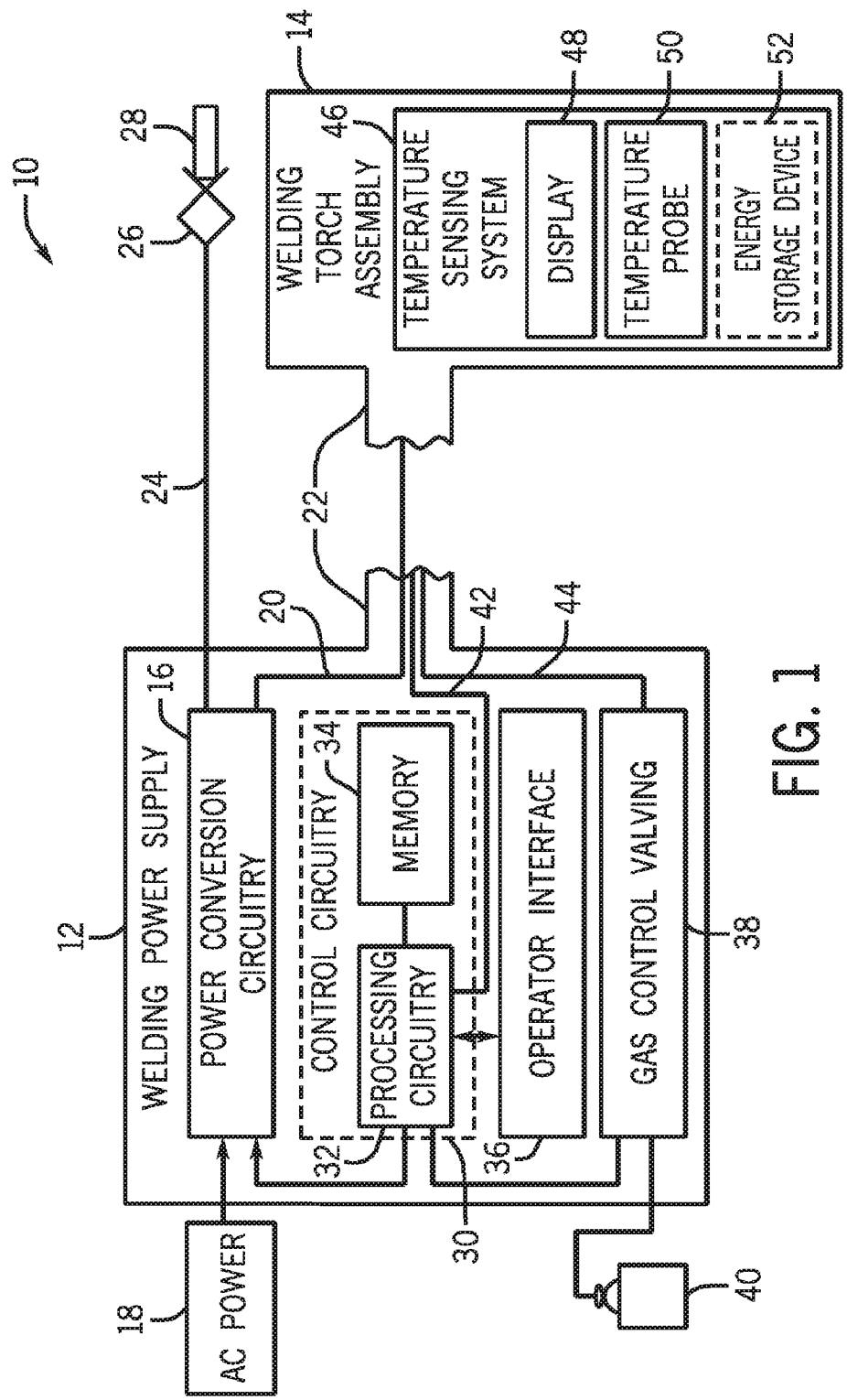
FIG. 1 is a block diagram illustrating an embodiment of a welding system that includes a welding power supply and a welding torch assembly having a temperature sensing system.

Turning now to the drawings, FIG. 1 illustrates a welding system 10 that powers, controls, and provides supplies for a welding operation. In the illustrated embodiment, the welding system 10 includes a welding power supply 12 and a welding torch assembly 14, and examples of suitable internal components included in the welding power supply 12 and the welding torch assembly 14 are shown. However, it should be noted that the particular components included in the welding power supply 12 and the welding torch assembly 14 of the welding system 10 are subject to implementation-specific variations that are within the scope of presently disclosed embodiments. That is, more or fewer components may be included in other embodiments, depending on features of the given application.

In the illustrated embodiment, the welding power supply 12 includes power conversion circuitry 16 that receives input power from an alternating current power source 18 (e.g., the AC power grid, an engine/generator set, a battery, or a combination thereof). The power applied to the power conversion circuitry 16 may originate in a power grid, although other sources of power may also be used, such as power generated by an engine-driven generator, batteries, fuel cells or other alternative sources. After receiving the input power, the power conversion circuitry 16 conditions the input power, and provides output power via lead 20 to the cable 22 to power one or more welding devices (e.g., welding torch assembly 14) in accordance with demands of the system 10. Accordingly, in some embodiments, the power conversion circuitry 16 may include circuit elements, such as transformers, rectifiers, switches, and so forth, capable of converting the AC input power to a direct current electrode positive (DCEP) or direct current electrode negative (DCEN) output, as dictated by the demands of the system 10. Additionally, a lead cable 24 terminating in a clamp 26 couples the power conversion circuitry 16 to a workpiece 28 and closes the circuit between the power supply 12, the workpiece 28, and the welding torch assembly 14.

The welding power supply 12 also includes control circuitry 30 that is configured to receive and process a plurality of inputs regarding the performance and demands of the system 10. The control circuitry 30 includes processing circuitry 32 and memory 34. The memory 34 may include volatile or non-volatile memory, such as read only memory (ROM), random access memory (RAM), magnetic storage memory, optical storage memory, or a combination thereof. Furthermore, a variety of control parameters may be stored in the memory 34 along with code configured to provide a specific output (e.g., initiate wire feed, enable gas flow, etc.) during operation. The processing circuitry 32 may also receive one or more inputs from an operator interface 36, through which the user may choose a process and input desired parameters (e.g., voltages, currents, particular pulsed or non-pulsed welding regimes, and so forth). The processing circuitry 32 is also coupled to gas control valving 38, which regulates the flow of shielding gas from a gas cylinder 40 to the torch 14. In general, such gas is provided at the time of welding, and may be turned on immediately preceding the weld and for a short time following the weld.

Based on such inputs received from the operator, the control circuitry 32 operates to control generation of welding power output for carrying out the desired welding operation, for example, via control signals transmitted to the power conversion circuitry 16. Based on such control commands, the power conversion circuitry 16 is configured to create the output power that will ultimately be applied to the welding wire at the torch 14. To this end, as noted above, various power conversion circuits may be employed, including choppers, boost circuitry, buck circuitry, inverters, converters, and so forth.

As shown, the welding power supply 12 provides power, control signals, and gas to the welding torch assembly 14 via leads 20, 42, and 44, respectively. In the illustrated embodiment, the leads 20, 42, and 44 combine into lead assembly 22 that couples the welding power supply 12 to the welding torch assembly 14. The illustrated welding torch assembly 14 includes a temperature sensing system 46 that may be utilized to sense a temperature of the workpiece 28. To that end, the depicted temperature sensing system 46 includes a display 48, a temperature probe 50, and an energy storage device 52. In certain embodiments, components of the temperature sensing system 46 may be integrated into the welding torch assembly 14. For example, in one embodiment, the temperature probe 50 including the display 48 may be coupled to a TIG welding torch of the welding torch assembly 14 and may be configured for use while attached to the TIG welding torch, as described in more detail below.

During operation, the temperature sensing system 46 may be utilized to measure the temperature of the workpiece 28, and the measured temperature may be displayed on the display 48. Further, in some embodiments, when the temperature sensing system 46 acquires such data regarding the temperature of the workpiece 28, this data is communicated to the control circuitry 30 located in the welding power supply 12 via lead assembly 22. In certain embodiments, once the acquired data is communicated to the control circuitry 30, the temperature may be communicated to the operator, for example, via the operator interface 36. However, in other embodiments, the temperature probe 50 may acquire the data and display the measurements on the display 48 to communicate the temperature of the workpiece to the operator.

In the illustrated embodiment, the energy storage device 52 is provided, for example, to produce power for operation of the temperature probe 50. The energy storage device 52 may be any suitable device capable of storing and discharging energy, such as a battery. In some embodiments, the energy storage device 52 may be removable from the temperature sensing system 46 to facilitate replacement or recharging of the device 52. However, in other embodiments, the energy storage device 52 may be irremovable and configured for charging while remaining integrated with the temperature sensing system 46.

Again, it should be noted that the temperature sensing system 46 may be provided as an integral part of the welding torch assembly 14 in some embodiments. That is, the temperature sensing system 46 may be integrated into the torch assembly 14, for example, during manufacturing of the torch. However, in other embodiments, the temperature sensing system 46 may be provided as a retrofit kit that may endow existing torch assemblies with the temperature sensing capabilities described herein. To that end, such retrofit kits may be configured as wired or wireless devices capable of communicating with one or more controllers of the weld system. For example, in one embodiment of the retrofit kit, the temperature sensing system 46 may be configured to mount to the welding torch and be programmable to communicate with the desired controller (e.g., control circuitry 30 located in the welding power supply) or to communicate directly with the operator via a display. In such an embodiment, the retrofit kit may be the temperature sensing system 46.

Figure 2:
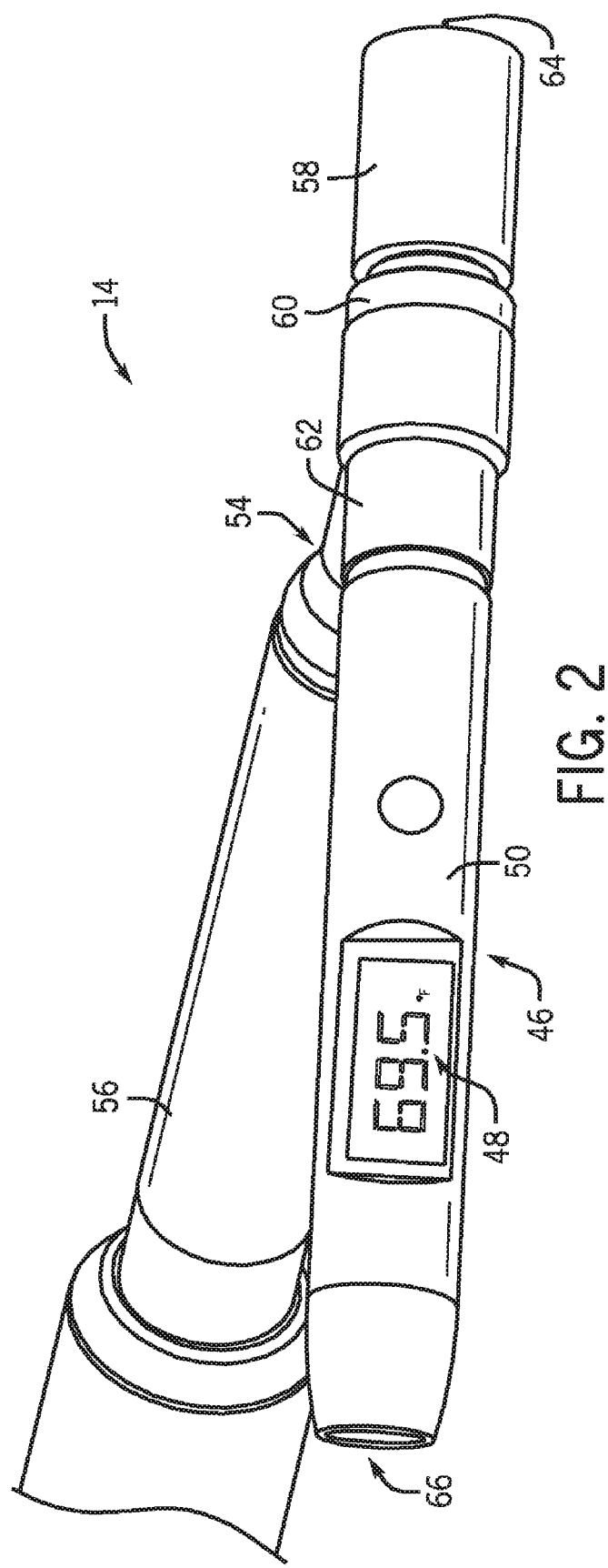
FIG. 2 is a perspective view of an embodiment of the welding torch assembly of FIG. 1.

FIG. 2 illustrates an embodiment of the welding torch assembly 14 having the temperature sensing system 46. The illustrated embodiment includes a TIG welding torch 54 having a handle 56, a shielding cone 58, a heat shield 60, a back cap 62, and a tungsten electrode 64. As shown, in this embodiment, the temperature probe 50 is mounted to the back cap 62 of the TIG welding torch 54. The temperature probe 50 is depicted in an attached position with respect to the back cap of the welding torch 54. In some embodiments, the temperature probe 50 may be integrated with the welding torch 54 such that tools are required for the removal of the temperature probe 50 from the welding torch 54. However, in other embodiments, the temperature probe 50 may be reversibly coupled to the back cap 62 of the welding torch 54 in a tool-less engagement such that the temperature probe 50 may be attached and detached from the back cap 62 without the use of tools.

While the temperature probe 50 is shown mounted to the back cap 62 of the welding torch 54 in the illustrated embodiment, it should be noted that in other embodiments, the temperature probe 50 may be coupled to the welding torch 54 in a variety of other locations. Indeed, in embodiments in which the temperature sensing system 46 is provided as a retrofit kit for existing welding torches, the temperature sensing system 46 may include implementation-specific features that facilitate the coupling of the temperature probe 50 to existing welding torches. For example, the temperature probe 50 may include recesses or protrusions designed to receive or insert into portions of existing welding torches.

During operation, the TIG welding torch 54 may be utilized by a welding operator to perform a welding process. That is, the welding power supply 12 provides power and shielding gas to the welding torch 54 for use at the weld location. The shielding gas is directed toward the weld area with the shielding cone 58, and the tungsten electrode 64, which is typically non-consumable, is utilized to produce the weld. It may be desirable to monitor the temperature of the workpiece 28 at various time points before, during, and after the welding operation. For example, in some instances, it may be desirable to preheat the workpiece 28 to a desired temperature before beginning the welding operation. Further, in some instances, it may be desirable to maintain the temperature of the workpiece 28 below a predetermined level during the welding operation to remain in accordance with welding guidelines for the particular part that is being welded.

The temperature sensing system 46, whether integral with the welding torch 54 or removably coupled to the welding torch 54, is configured to sense the temperature of the workpiece when a temperature measurement is desired by the operator. For example, in embodiments in which the temperature probe 50 is integral with the welding torch 54, the operator may rotate the welding torch to position an end portion 66 of the temperature probe 50 in proximity to the workpiece 28. In other embodiments, the operator may remove the temperature probe 50 from the back cap 62 of the welding torch 54 without the use of tools, position the end portion 66 of the temperature probe near or on the workpiece 28 for the temperature reading, and reattach the temperature probe 50 to the welding torch 54. However, regardless of the attachment between the temperature probe 50 and the welding torch 54, in the illustrated embodiment, the temperature probe 50 may display the measured temperature on the display 48 to communicate the workpiece temperature to the operator at the weld location. In other embodiments, the temperature probe 50 may communicate the measured temperature to the operator through other interfaces, such as the operator interface 36 located on the welding power supply 12.

Figure 3:
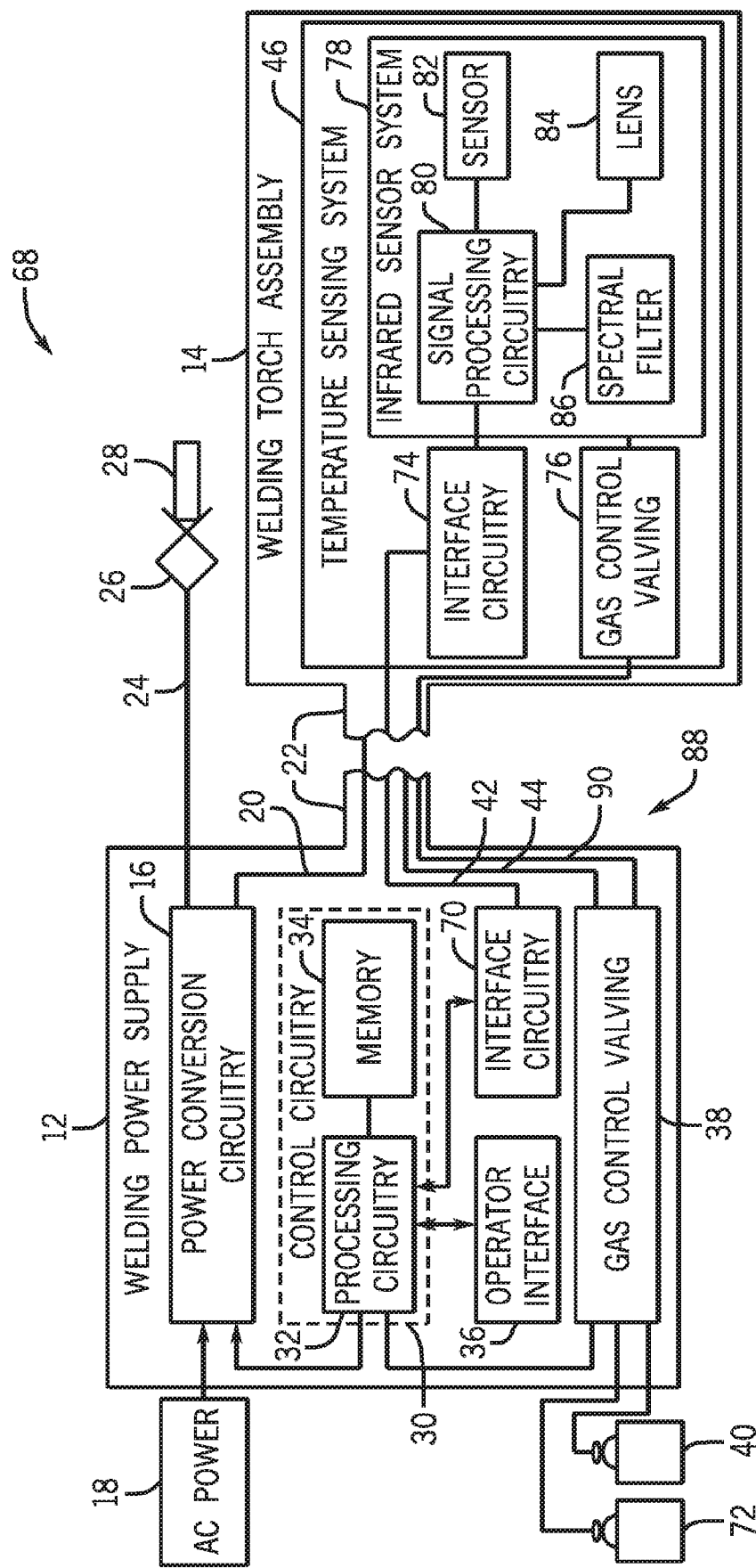
FIG. 3 is a block diagram illustrating an embodiment of a welding system that includes a welding power supply and a welding torch assembly having an infrared sensing system.

FIG. 3 illustrates an alternate embodiment of a welding system 68 including the welding power supply 12 and the welding torch assembly 14. As before, the welding power supply 12 includes the power conversion circuitry 16, the control circuitry 30, and the operator interface 36 that operate as previously described. However, the welding power supply 12 also includes interface circuitry 70 that facilitates communication between the control circuitry 30 of the welding power supply 12 and components of the temperature sensing system 46. Additionally, in this embodiment, the welding power supply 12 also includes a connection to another gas cylinder 72, which may contain a gas (e.g., argon) suitable for cleaning or cooling of one or more components of the temperature sensing system 46.

In the depicted embodiment, the welding torch assembly 14 includes an alternate embodiment of the temperature sensing system 46. The temperature sensing system 46 includes interface circuitry 74, gas control valving 76, and an radiation thermometer 78. The radiation thermometer 78 includes signal processing circuitry 80, a sensor 82, a lens 84, and a spectral filter 86. The sensor 82 may be any of a variety of suitable sensors capable of measuring the temperature of the workpiece 28. For example, in certain embodiments, the sensor 82 may be an optical pyrometer capable of detecting infrared radiation from the workpiece 28 to determine the temperature of the workpiece without coming into contact with the workpiece 28. That is, in some embodiments, the sensor 82 may be capable of measuring the temperature of the workpiece 28 via a non-contact method. Additionally, the sensor 82 may be formed from a variety of suitable materials, such as lead selenide, lead sulfide, gallium indium arsenide, fiber optics, and so forth.

During operation, the radiation thermometer 78 is controlled to measure the workpiece temperature, for example, at a location outside of a gas shielding area existing about the weld area. That is, as thermal radiation is emitted from the workpiece 28, the infrared sensing system 46 measures the temperature of the workpiece 28 by converting the radiant power contained in the emitted heat into an electrical signal corresponding to the amount of detected heat. Specifically, in one embodiment in which the sensor 82 is an optical pyrometer, the thermal radiation may be focused onto a detector with a suitable optical system to determine the temperature of the workpiece 28.

In the depicted embodiment, the sensor 82 detects the thermal radiation being emitted by the workpiece 28, and the thermal radiation is converted into an electrical signal that is communicated to the signal processing circuitry 80. The signal processing circuitry 80 processes the electrical signals from the sensor 82, for example, by filtering the received signals to remove noise introduced from the welding environment. Additionally, the signal processing circuitry 80 may be configured to communicate the received temperature measurements to the control circuitry 30 located in the welding power supply 12. For example, the signal processing circuitry 80 may communicate the temperature measurements to the control circuitry 30 via the interface circuitry 74, the lead assembly 22, and the interface circuitry 70. The control circuitry 30 may further process or store the received temperature measurements, for example, in order to track the temperature of the workpiece 28 throughout the welding operation or to monitor the workpiece temperature to ensure that the temperature does not exceed a predetermined threshold.

Still further, the welding system 68 includes a protective and/or cooling circuit 88 capable of circulating fluid to components of the radiation thermometer 78 for protection and/or cooling of such components. In one embodiment, the circuit 88 may include the gas cylinder 72, the gas control valving 38, the gas lead 90, and the gas control valving 76. In one embodiment, the circuit 88 may be configured to circulate a gas (e.g., argon) suitable for cleaning of the lens 84 from the gas cylinder 72 to the lens 84. In another embodiment, the circuit 88 may be configured to circulate a gas argon suitable for cooling of the sensor 82 from the gas cylinder 72 to the sensor 82.

Figure 4:
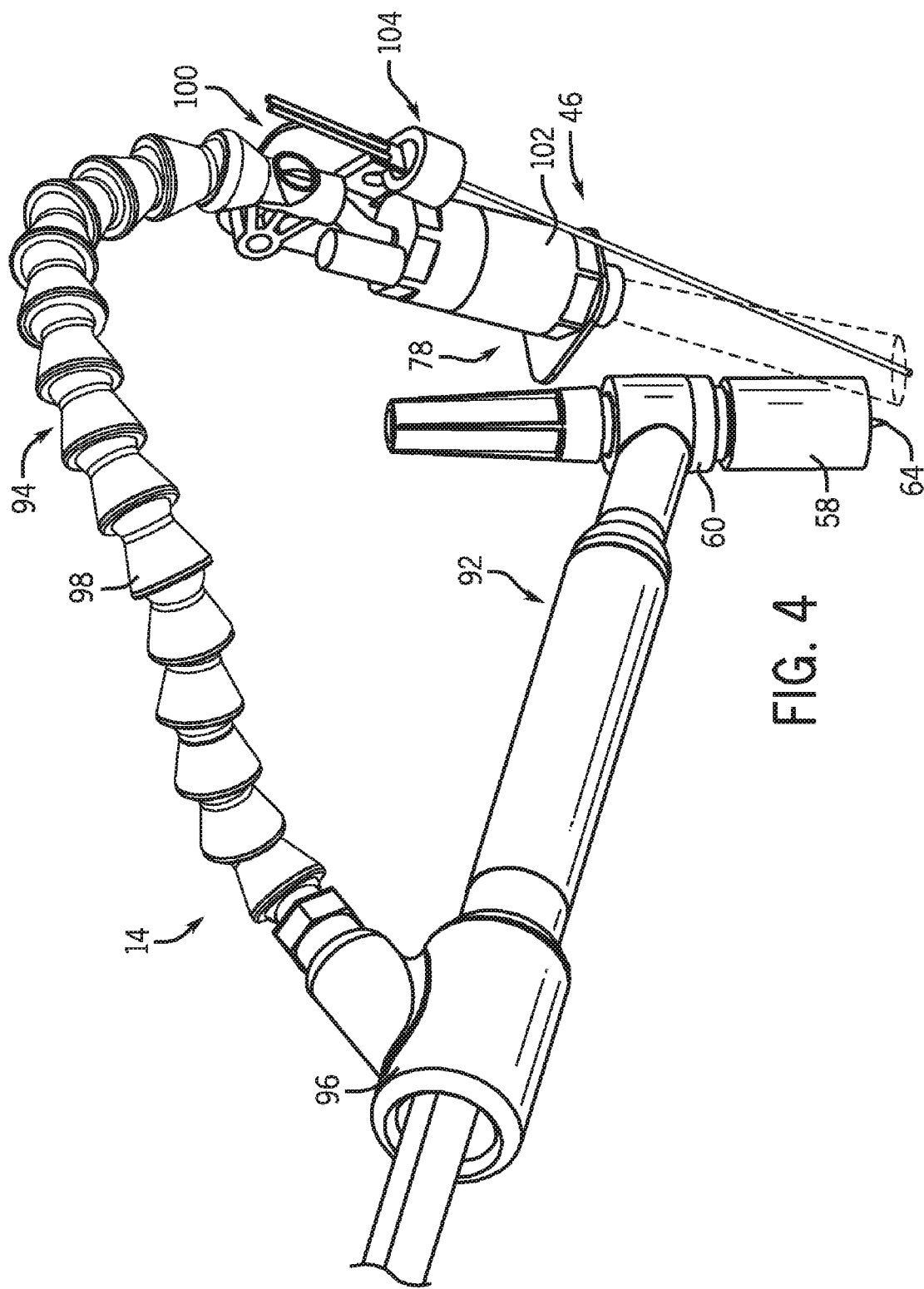
FIG. 4 is a is a perspective view of an embodiment of the welding torch assembly of FIG. 3.

FIG. 4 is a perspective view of an embodiment of the welding torch assembly 14 including a TIG welding torch 92 having the temperature sensing system 46 mounted thereon. In the illustrated embodiment, the temperature sensing system 46 includes an assembly 94 capable of coupling to the welding torch 92 and measuring a temperature of the workpiece 28 without directly contacting the workpiece 28. The assembly 94 includes a torch mount 96, an adjustable coupling device 98 (e.g., a gooseneck), a mounting assembly 100, a sensor assembly 102, and a targeting assembly 104. The torch mount 96 is utilized to couple the assembly 94 to the welding torch 92, and the adjustable coupling device 98 is utilized to position the sensor assembly 102 in the desired position with respect to a weld bead on a workpiece.

More specifically, during operation, the adjustable coupling device 98 is adjusted to position the sensor assembly 102 such that the sensor assembly 102 is located in a position suitable for obtaining temperature measurements of the workpiece 28 without contacting the workpiece 28. In some embodiments, the adjustable coupling device 98 may be manually adjusted by an operator or may be automatically adjusted to the desired position by a suitable controller, such as control circuitry 30 located in the welding power supply 12. Once positioned, the sensor assembly 102 and the targeting assembly 104 cooperate to obtain a measurement of the temperature of the workpiece via a non-contact method. These temperature measurements may be obtained continuously throughout the welding operation, for example, to monitor the workpiece temperature throughout the operation, or at desired time intervals, for example, to check that the workpiece temperature does not exceed a desired threshold.

Figure 5:
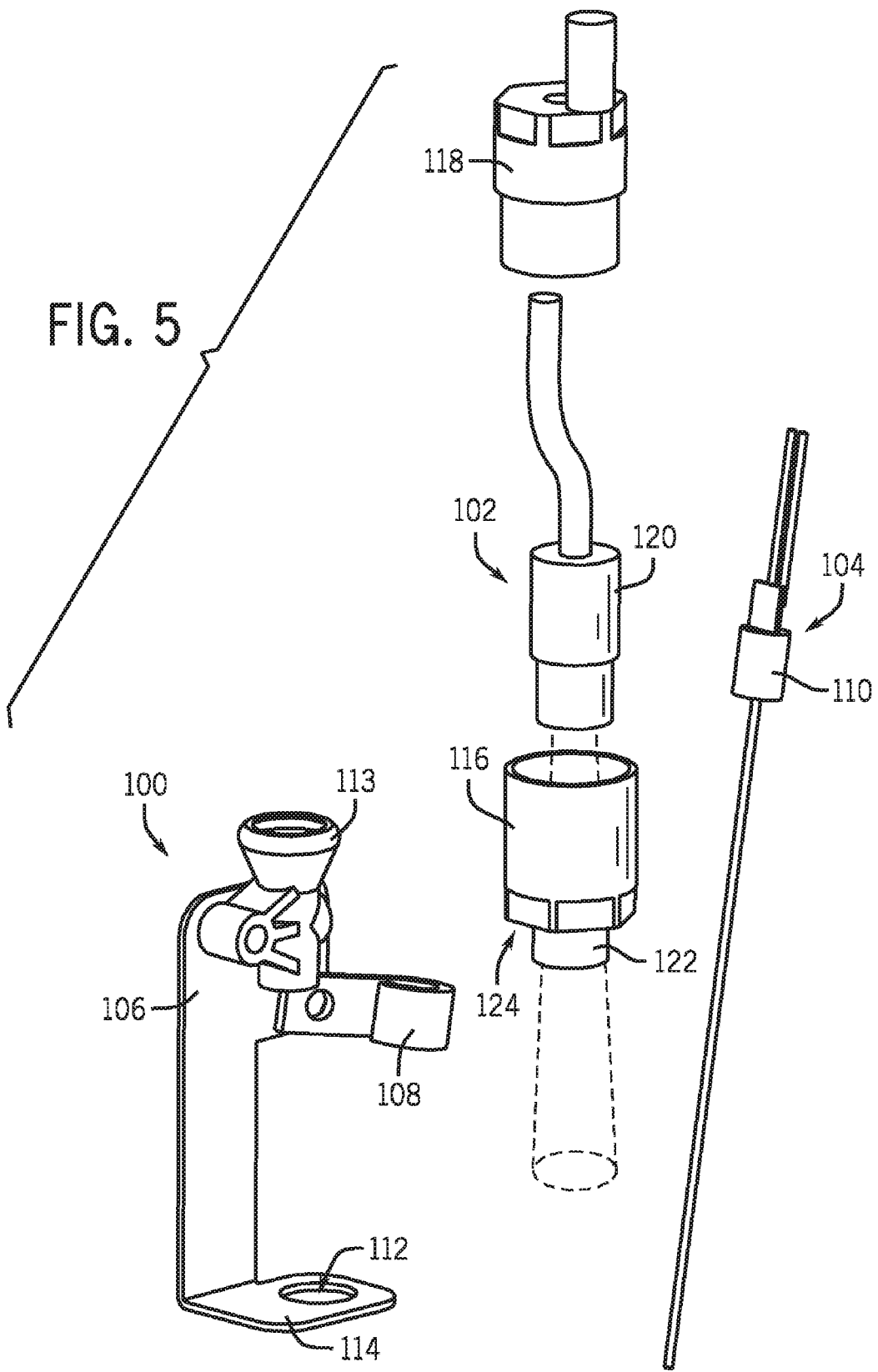
FIG. 5 is an exploded view of an embodiment of the infrared sensing and mounting system of FIG. 4.

Embodiments of the components of the mounting assembly 100, the sensor assembly 102, and the targeting assembly 104 are shown in more detail in the exploded view of FIG. 5. As shown in FIG. 5, the mounting assembly 100 includes mounting device 106. The mounting device 106 includes an extension 108 capable of receiving and securing a body 110 of the targeting assembly 104. Further, the mounting device 106 also includes a coupling device 113 that couples the mounting device 106 to the adjustable coupling device 98. Additionally, the mounting device 106 includes an aperture 112 disposed in a bottom portion 114 of the mounting device 106 and shaped to receive components of the sensor assembly 102.

In the illustrated embodiment, the sensor assembly 102 includes an air purge jacket having a first portion 116 and a second portion 118 and a pyrometer 120 adapted to be received between the air purge jacket portions 116 and 118. The air purge jacket portion 116 includes an extension 122. In the illustrated embodiment, the extension 122 is dimensioned to be received by the aperture 112 in the mounting device 106 such that a bottom portion 124 of the air purge jacket portion 116 contacts the bottom portion 114 of the mounting device 106.

Figure 6:
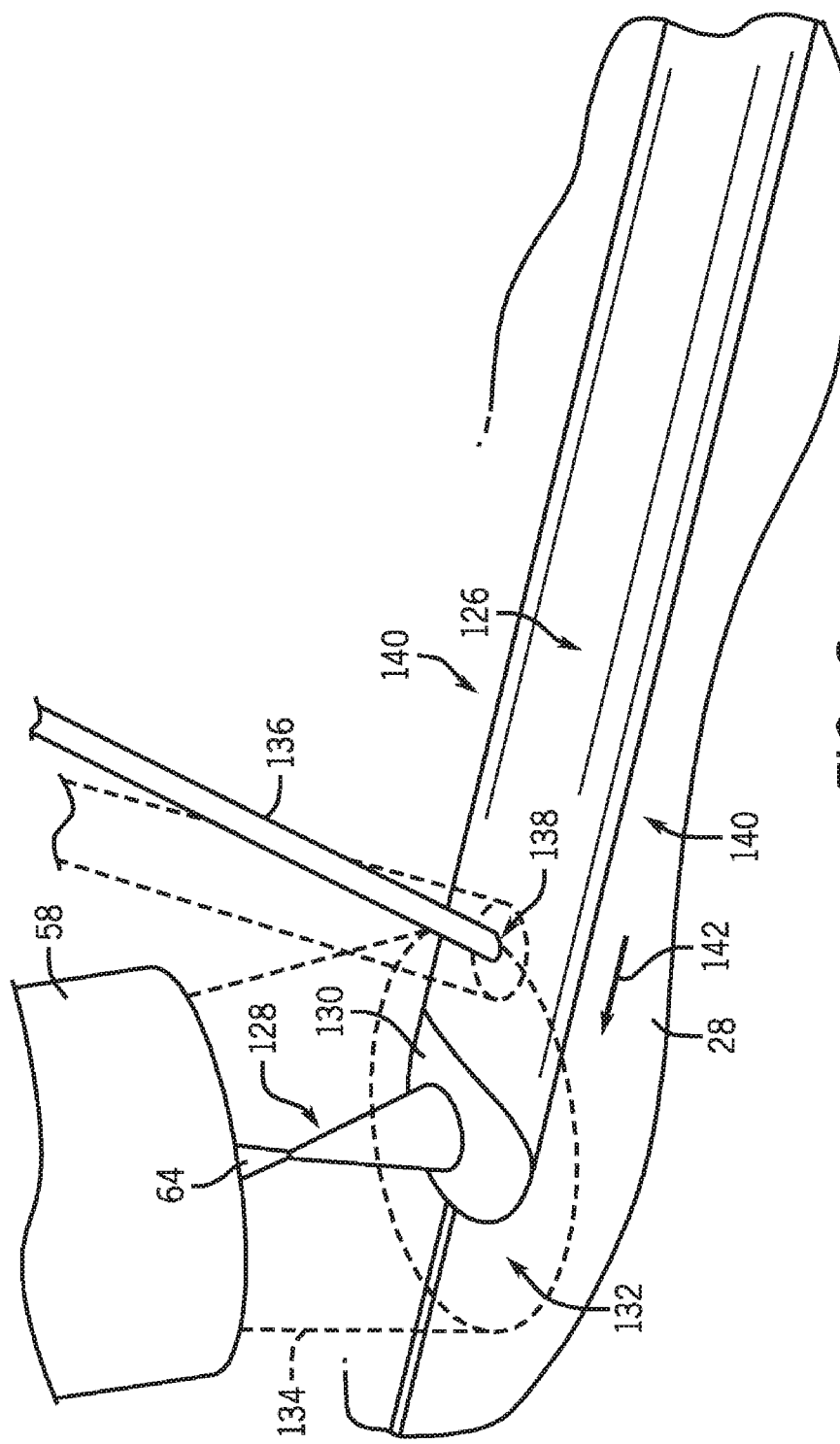
FIG. 6 illustrates use of a temperature sensing system to sense a temperature of a workpiece along a weld bead in accordance with a presently disclosed embodiment.

FIG. 6 is a schematic illustrating operation of the welding torch assembly 14 and the temperature sensing system 46 shown in FIG. 4. As illustrated, the schematic includes a weld bead 126 during formation on the workpiece 28 as a welding operation proceeds along the length of the workpiece 28. A welding arc 128 is established between the tungsten electrode 64 and the workpiece 28, thereby forming a weld pool 130. The weld pool 130 is located in a welding area 132 established by the boundaries of a shielding gas cone 134. A laser 136 originating from the targeting assembly 104 targets a temperature detection zone 138 in which the temperature of the workpiece 28 is measured.

In some embodiments, the temperature detection zone may be located at a position that is outside of the weld pool 130. For example, in certain embodiments, the temperature detection zone 138 may be located outside of the welding area 132 defined by the shielding gas cone 134 or may be located along the periphery of the shielding gas cone 134. Indeed, the temperature detection zone 138 may be positioned at any desired location in a heat affected zone 140 extending outward along the workpiece from the weld bead 126 and the weld pool 130.

During operation, as the welding operation proceeds in the direction indicated by arrow 142, the temperature sensing system 46 acquires data corresponding to the temperature of the workpiece 28 in the temperature detection zone 138. The temperature sensing system 46 may then process the received data or may transfer the data to a suitable controller before communicating the detected temperature to the operator. Because the temperature sensing system 46 is capable of acquiring data corresponding to the temperature of the workpiece 28 during the welding operation, presently disclosed embodiments may reduce or eliminate the need for an operator to stop welding in order to determine the workpiece temperature. The foregoing feature may offer advantages over systems that do not have an integrated temperature sensing system and may require an operator to stop welding in order to verify that the workpiece temperature has not exceeded a predetermined threshold.

Figure 7:
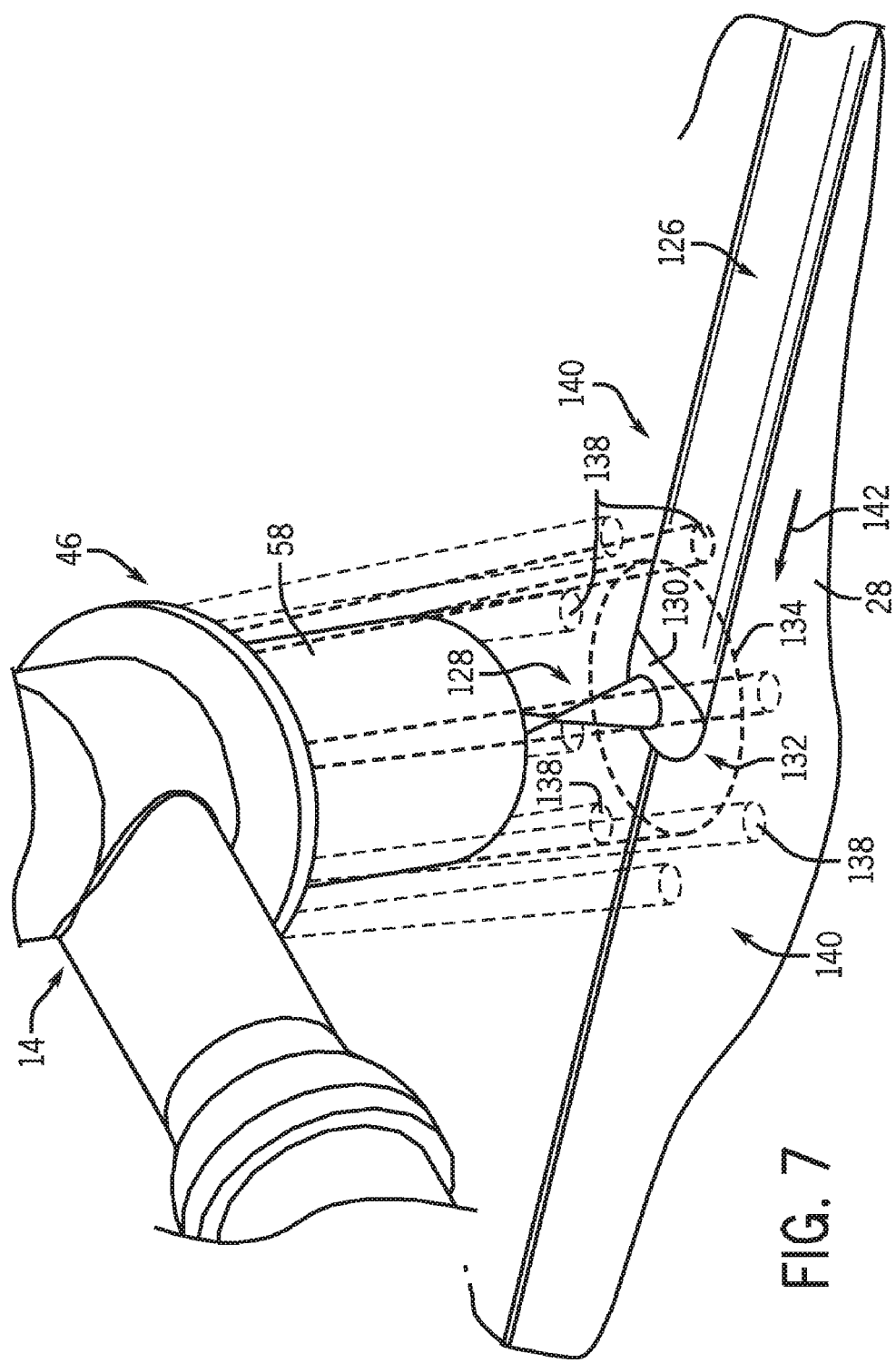
FIG. 7 illustrates use of a temperature sensing system to sense a workpiece temperature in a plurality of positions about a welding area in accordance with a presently disclosed embodiment.

FIG. 7 is a schematic illustrating operation of an alternate embodiment of the temperature sensing system 46 capable of detecting the temperature of the workpiece 28 at a plurality of locations. That is, the temperature sensing system 46 of FIG. 7 is configured to utilize a non-contact method to measure data corresponding to the temperature of the workpiece 28 in the plurality of temperature detection zones 138. In the illustrated embodiment, the temperature detection zones 138 are disposed about the perimeter of the shielding gas cone 134. However, in other embodiments, the temperature detection zones 138 may be located anywhere within the heat affected zone 140. Therefore, as compared to traditional systems, presently disclosed embodiments may enable monitoring of the workpiece temperature at a plurality of locations instead of a single location. In certain embodiments, this feature may enable a suitable processor, such as signal processing circuitry 80, to identify which locations in the heat affected zone 140 are hotter than others, thus enabling the temperature sensing system with the ability to identify hot spots during the welding operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch configured to perform a welding operation, comprising:
   a shielding cone;
   a tungsten electrode within the shielding cone;
   a back cap; and
   a temperature sensing system attached to the back cap, the temperature sensing system comprising a temperature probe configured to sense a temperature relating to the welding operation.

2. The welding torch of claim 1, wherein the temperature sensing system is reversibly attached to the back cap.

3. The welding torch of claim 1, wherein the temperature sensing system is configured to be attached to, or detatched from, the back cap without the use of tools.

4. The welding torch of claim 1, wherein the temperature sensing system further comprises a display configured to display the temperature.

5. The welding torch of claim 1, wherein the temperature sensing system is configured to communicate the temperature to a welding system.

6. A welding system, comprising:
   a welding torch configured to perform a welding operation;
   a sensor assembly configured to sense a temperature relating to the welding operation at a temperature detection zone, wherein the temperature detection zone is outside of a shielding gas cone created by the welding torch or on a perimeter of the shielding gas cone created by the welding torch;
   a torch mount that couples the sensor assembly to the welding torch;
   an adjustable coupling device attached to the torch mount and the sensor assembly, the adjustable coupling device configured to adjust a position of the sensor assembly relative to the welding torch or torch mount; and
   a mounting assembly attached to the adjustable coupling device, the mounting assembly configured to secure a targeting assembly.

7. The welding system of claim 6, wherein the targeting assembly is configured to target the temperature detection zone.

8. The welding system of claim 6, wherein the targeting assembly is configured to emit a laser at the temperature detection zone.

9. The welding system of claim 6, wherein the sensor assembly comprises an air purge jacket and a pyrometer retained by the air purge jacket.

10. The welding system of claim 6, further comprising interface circuitry configured to communicate the temperature to a welding system.

11. A method of sensing temperature relating to a welding operation, comprising:
    performing a welding operation via a welding torch;
    sensing a temperature relating to the welding operation at a temperature detection zone via a sensor assembly, wherein the temperature detection zone is outside of a shielding gas cone created by the welding torch or on a perimeter of the shielding gas cone created by the welding torch; and
    targeting the temperature detection zone via a targeting assembly secured to the sensor assembly.

12. The method of claim 11, further comprising communicating the temperature to a welding system.

13. The method of claim 11, wherein the sensor assembly comprises a radiation thermometer configured to sense the temperature, the method further comprising circulating fluid to the radiation thermometer for protection or cooling.

14. The method of claim 13, wherein the radiation thermometer includes a pyrometer configured to sense the temperature.

15. The method of claim 11 wherein the sensor assembly is adjustably mounted to the welding torch.

16. A welding torch configured to perform a welding operation, comprising:
    a back cap; and
    a temperature sensing system reversibly attached to the back cap, the temperature sensing system comprising a temperature probe configured to sense a temperature relating to the welding operation.

17. The welding torch of claim 16, further comprising:
    a shielding cone; and
    a tungsten electrode within the shielding cone.

18. A method of sensing temperature relating to a welding operation, comprising:
    performing a welding operation via a welding torch;
    sensing a temperature relating to the welding operation at a temperature detection zone via a sensor assembly, the temperature detection zone being outside of a shielding gas cone created by the welding torch or on a perimeter of the shielding gas cone created by the welding torch, and the sensor assembly comprising a radiation thermometer configured to sense the temperature; and
    circulating fluid to the radiation thermometer for protection or cooling.

19. The method of claim 18, wherein the radiation thermometer comprises a pyrometer configured to sense the temperature.

20. The method of claim 18, further comprising targeting the temperature detection zone via a targeting assembly secured to the sensor assembly.

* * * * *